(12) United States Patent
Jaradi et al.

(10) Patent No.: US 11,311,434 B2
(45) Date of Patent: Apr. 26, 2022

(54) PANEL DESIGNED TO ENGAGE WHEELS OF WHEELCHAIR

(71) Applicant: Ford Global Technologies, LLC, Dearborn, MI (US)

(72) Inventors: Dean M. Jaradi, Macomb, MI (US); Anil Kalra, Canton, MI (US); S. M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/034,546

(22) Filed: Sep. 28, 2020

(65) Prior Publication Data
US 2022/0096289 A1  Mar. 31, 2022

(51) Int. Cl.
| | | |
|---|---|---|
| *A61G 3/08* | (2006.01) |
| *B60R 16/02* | (2006.01) |
| *B62D 25/20* | (2006.01) |
| *B60R 22/34* | (2006.01) |
| *B60R 22/18* | (2006.01) |
| *B60R 21/16* | (2006.01) |

(52) U.S. Cl.
CPC ........ *A61G 3/0808* (2013.01); *B60R 16/0207* (2013.01); *B60R 21/16* (2013.01); *B60R 22/18* (2013.01); *B60R 22/34* (2013.01); *B62D 25/20* (2013.01); *B60R 2022/1806* (2013.01)

(58) Field of Classification Search
CPC ........ A61G 3/08; A61G 3/085; A61G 3/0808; B62D 25/20; B60R 16/0207; B60R 2022/1806
See application file for complete search history.

(56) References Cited

U.S. PATENT DOCUMENTS

| 4,407,616 A | 10/1983 | Hinze |
| 4,805,954 A | 2/1989 | Lazaroff |

(Continued)

FOREIGN PATENT DOCUMENTS

| CN | 105774746 A | * | 7/2016 |
| JP | 2000116713 A | * | 4/2000 |

(Continued)

OTHER PUBLICATIONS

Sang, Apparatus for Fixing Wheel Chair, Jul. 12, 2004, EPO, KR 100439802 B1, Machine Translation of Description (Year: 2004).*

(Continued)

*Primary Examiner* — Paul N Dickson
*Assistant Examiner* — Matthew D Lee
(74) *Attorney, Agent, or Firm* — Frank A. MacKenzie; Bejin Bieneman PLC (57) ABSTRACT

An assembly for a vehicle includes a panel. The panel includes a first channel and a second channel spaced from and parallel to each other. The first and second channels are designed to engage wheels of a wheelchair. The assembly includes a latch supported by the panel. The latch is moveable between an unlatched position and a latched position. The latch is retracted from the first channel in the unlatched position and elongated across the first channel in the latched position. The panel includes releasable connections designed to releasably engage a vehicle floor.

20 Claims, 9 Drawing Sheets

(56) References Cited

U.S. PATENT DOCUMENTS

| | | | | |
|---|---|---|---|---|
| 5,259,081 | A | * | 11/1993 | Henderson ............. A61G 3/061 |
| | | | | 14/71.1 |
| 5,388,937 | A | * | 2/1995 | Farsai ..................... B60P 3/077 |
| | | | | 188/32 |
| 5,713,704 | A | | 2/1998 | Pommier et al. |
| 6,113,325 | A | | 9/2000 | Craft |
| 6,698,983 | B1 | * | 3/2004 | Kiernan ............... A61G 3/0808 |
| | | | | 410/12 |
| 2017/0296406 | A1 | * | 10/2017 | De Bijl ................ B60P 7/0823 |
| 2019/0133852 | A1 | * | 5/2019 | Ghannam ............ A61G 3/0808 |
| 2020/0155386 | A1 | * | 5/2020 | Kumar ................ A61G 3/0808 |

FOREIGN PATENT DOCUMENTS

| | | | | |
|---|---|---|---|---|
| JP | 2002058706 A | * | 2/2002 | |
| JP | 2017159872 A | * | 9/2017 | |
| KR | 20030050008 A | * | 6/2003 | |
| KR | 100439802 B1 | * | 7/2004 | |
| WO | WO-2016157081 A1 | * | 10/2016 | ............. B64D 11/00 |

OTHER PUBLICATIONS

Azumi, Seat Belt Device For Vehicle, Jul. 20, 2016, EPO, CN 105774746 A, Machine Translation of Description (Year: 2016).*

* cited by examiner

PANEL DESIGNED TO ENGAGE WHEELS OF WHEELCHAIR

BACKGROUND

Passenger vehicle are not typically designed to accommodate wheelchairs. Therefore, accommodations for wheelchairs in vehicles are typically installed with aftermarket modifications to a production vehicle. For example, a vehicle may be modified with a lift or the like to load a wheelchair onto a vehicle. Often, a wheelchair will be stowed in a cargo area once a passenger is transferred to a vehicle seat. Production vehicles typically do not have the ability to accommodate the wheelchair of an occupant in a manner allowing the occupant to sit in the wheelchair in the vehicle, or if they do, significant aftermarket modification is required.

DETAILED DESCRIPTION

A vehicle includes a vehicle floor. The vehicle includes a panel removably attached to and supported by the vehicle floor with the panel being designed to engage wheels of a wheelchair. The vehicle includes a latch supported by the panel and being moveable between an unlatched position and a latched position.

The vehicle floor may include fastener holes arranged in a pattern and the panel includes fastener holes arranged in the pattern. The vehicle may include fasteners engaging the panel to the vehicle floor through the fastener holes of the panel and the vehicle floor.

The vehicle may include a seat having a mounting base including fastener holes arranged in the pattern of the fastener holes of the vehicle floor.

The panel may include a pair of channels spaced from and parallel to each other with the channels being designed to engage wheels of a wheelchair. The latch may include a solenoid including a body mounted to the panel and a post extendable from the body. The post may be retracted from a first channel of the pair of channels in the unlatched position and being elongated across the first channel when the latch is in the latched position.

The vehicle may include a restraint control module and a wiring harness. The wiring harness may be supported by the panel and connected to the solenoid and the wiring harness may be connected to the restraint control module.

The panel may define a pair of holes in the first channel. The post of the solenoid may extend through both holes in the latched position and being retracted from at least one of the holes in the unlatched position.

The body of the solenoid may be between the panel and the vehicle floor.

The vehicle may include a wiring harness supported by the panel and connected to the latch. The vehicle may include a computer, the latch being releasably connectable to the computer. The computer may have a processor and memory storing instructions executable by the processor to control components of the vehicle based on connection of the wiring harness to the computer.

The latch may be electronic.

The vehicle may include an airbag with the memory storing instructions to control at least the airbag based on connection of the wiring harness to the computer.

The vehicle may include a seat belt retractor with the memory storing instructions to control at least the seat belt retractor based on connection of the wiring harness to the computer.

The vehicle may include a seat belt buckle supported by the panel. The seat belt buckle may be releasably connectable to the seat belt retractor.

The vehicle may include a seat belt buckle supported by the panel.

An assembly includes a panel including a first channel and a second channel spaced from and parallel to each other with the first and second channels being designed to engage wheels of a wheelchair. The assembly includes a latch supported by the panel and the latch being moveable between an unlatched position and a latched position with the latch being retracted from the first channel in the unlatched position and elongated across the first channel in the latched position. The panel includes releasable connections designed to releasably engage a vehicle floor.

The latch may include a solenoid including a body mounted to the panel and a post extendable from the body with the post being retracted from the first channel in the unlatched position and being elongated across the first channel when the latch is in the latched position.

The panel may include a pair of holes in the first channel, the post of the solenoid extending through both holes in the latched position and being retracted from at least one of the holes in the unlatched position.

The assembly may include a wiring harness supported by the panel and connected to the solenoid with the wiring harness being designed to be connected to a restraint control module.

The panel may include a top surface and a bottom surface facing opposite the top surface, the first channel is on the top surface of the panel and the body of the solenoid is disposed on the bottom surface of the panel. The panel may include a pair of holes in the first channel with the post of the solenoid extending through both holes across the top surface of the panel in the latched position and being retracted from at least one of the holes in the unlatched position.

The assembly may include a wiring harness. The wiring harness may be supported by the panel and connected to the solenoid, the wiring harness being releasably connectable to a restraint control module.

The assembly may include a seatbelt buckle supported by the panel.

With reference to the Figures, wherein like numerals indicate like parts throughout the several views, an assembly 10 for a vehicle 12 includes a panel 14. The panel 14 includes a first channel 16 and a second channel 18 spaced from and parallel to each other. The first and second channels 16, 18 are designed to engage wheels of a wheelchair. The assembly 10 includes a latch 20 supported by the panel 14. The latch 20 is moveable between an unlatched position and a latched position. The latch 20 is retracted from the first channel 16 in the unlatched position and elongated across the first channel 16 in the latched position. The panel 14 includes releasable connections 22 designed to releasably engage a vehicle floor 28.

The panel 14 may be installed in a vehicle 12 to replace a seat 30 in the vehicle 12. The releasable connections 22 of the panel 14 allow the panel 14 to be installed and connected to the vehicle floor 28 and allow the panel 14 to be removed from the vehicle floor 28. When the panel 14 is installed, the wheels of a wheelchair may be received by the channels 16, 18 of the panel 14. When the latch 20 is in the unlatched position, the wheels of the wheelchair may move freely in the channels 16, 18 of the panel 14 to position the wheelchair in the channels 16, 18 of the panel 14. The wheel of the wheelchair may be moved to a position adjacent the latch 20, such that the latch 20 will engage the wheel in the latched position. In the latched position, the latch 20 secures a wheel of the wheelchair to limit the movement of the wheel. Securing the wheel with the latch 20 limits the movement of the wheels in the channels 16, 18 in the event of a sudden deceleration of the vehicle 12.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

Figure 1:
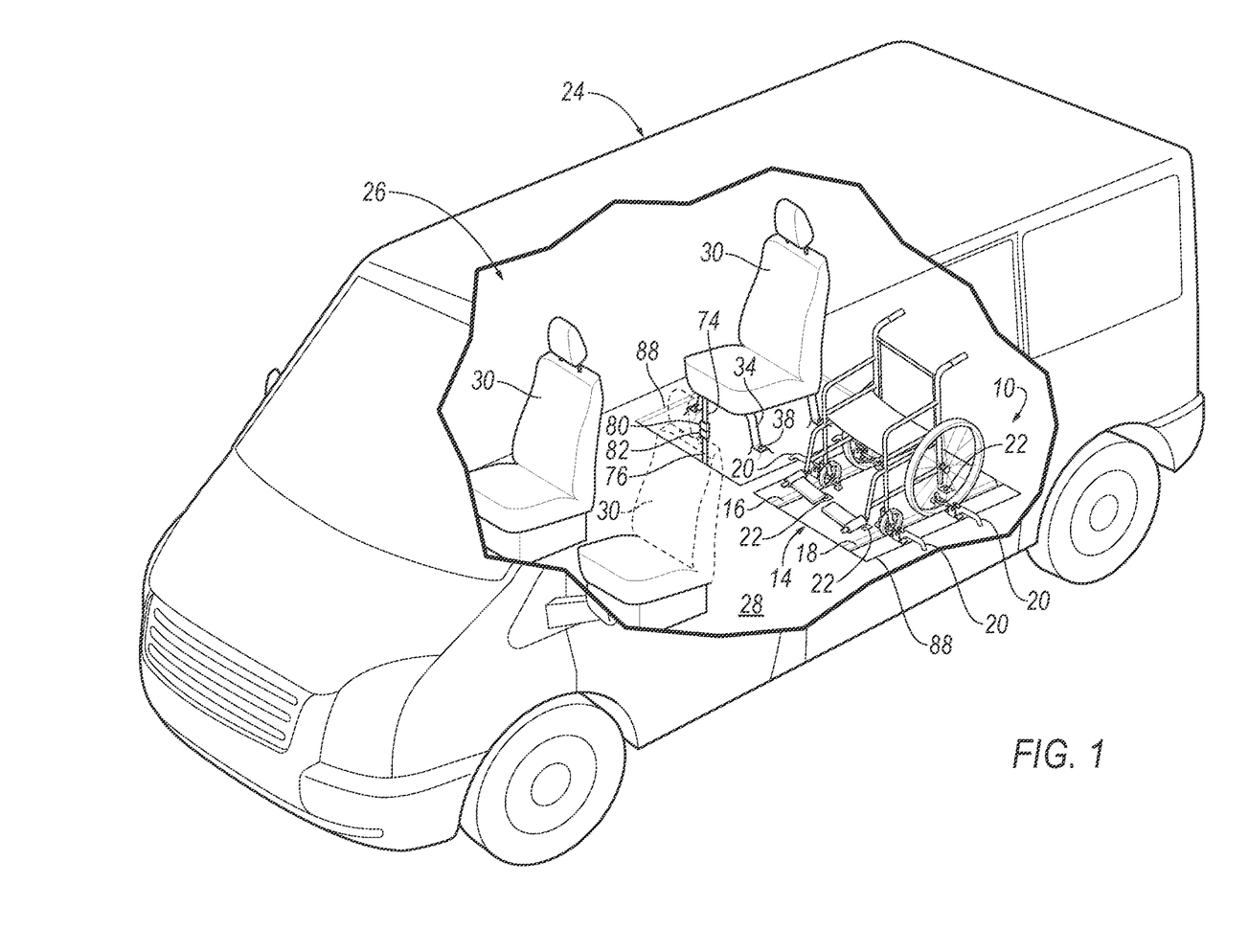
FIG. 1 is a perspective view of a vehicle including a panel designed to engage wheel of a wheelchair.
Figure 2:
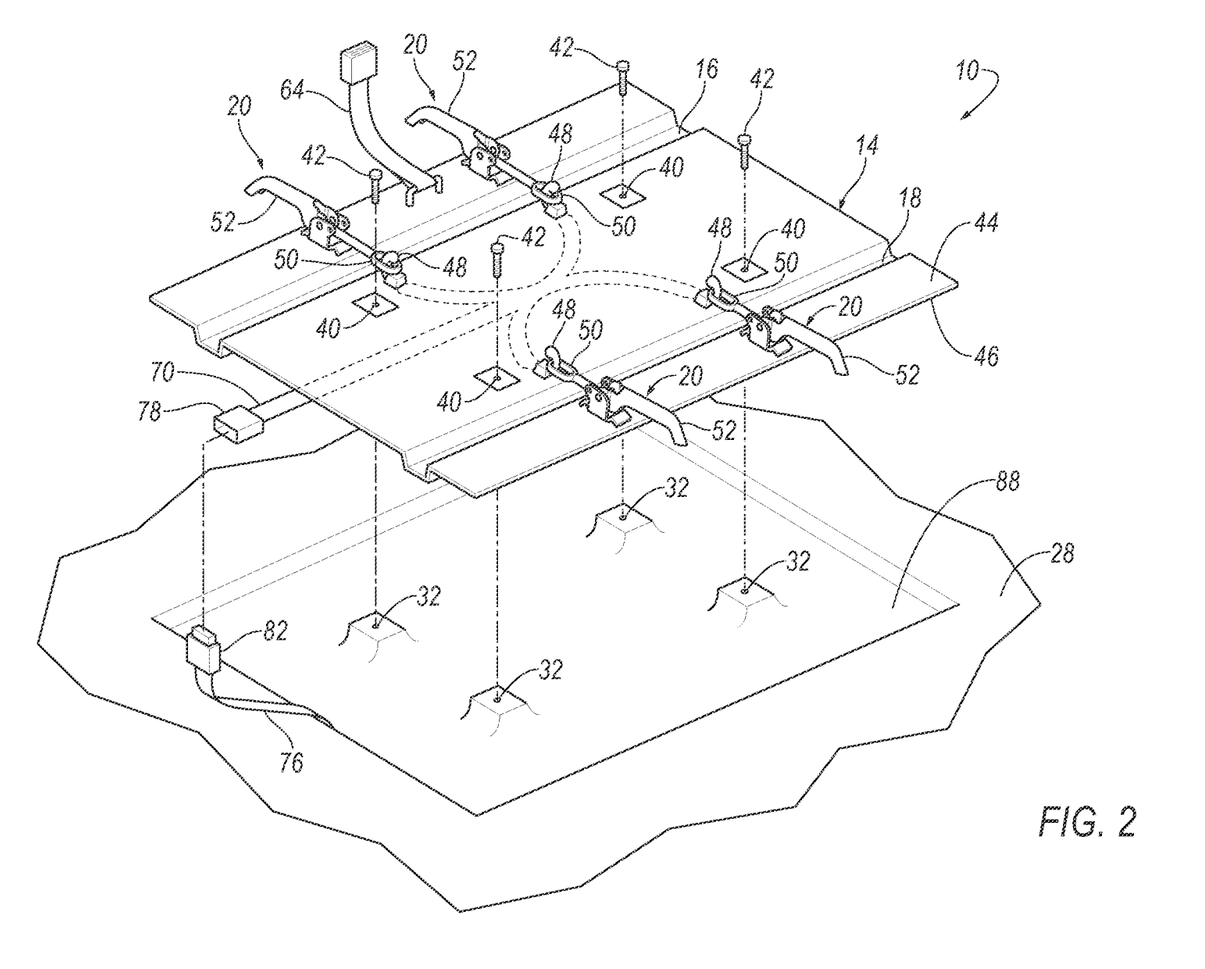
FIG. 2 is a perspective view of the panel designed to engage the wheels of a wheelchair.
Figure 3:
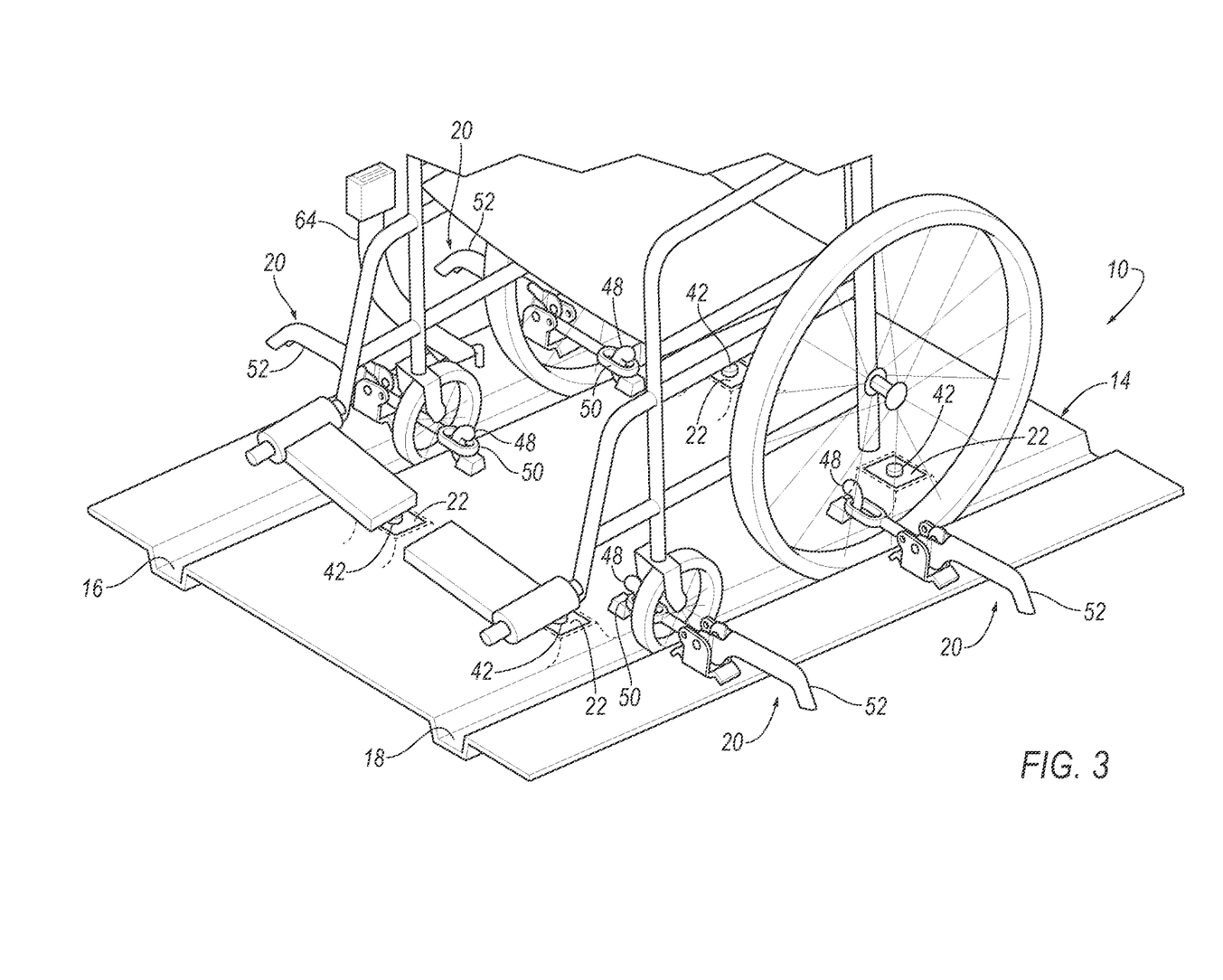
FIG. 3 is a perspective view of the panel engaged with wheels of a wheelchair.
Figure 4:
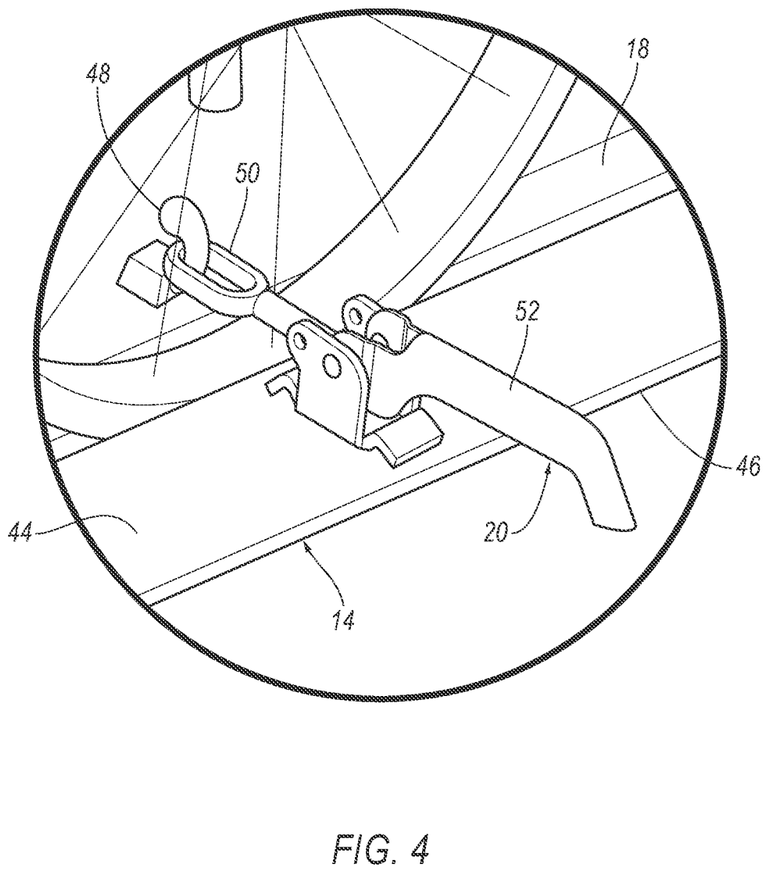
FIG. 4 is a perspective view of a latch supported by the panel engaged with a rear wheel of the wheelchair.

With reference to FIG. 1, the vehicle 12 includes the vehicle body 24. The vehicle body 24 may be of a unibody construction. In the unibody construction, the body, e.g., rockers, serves as a vehicle frame, and the vehicle body 24 (including the rockers, pillars, roof rails, etc.) is unitary, i.e., a continuous one-piece unit. As another example, the vehicle body 24 and frame may have a body-on-frame construction (also referred to as a cab-on-frame construction). In other words, the vehicle body 24 and frame are separate components, i.e., are modular, and the vehicle body 24 is supported on and affixed to the frame. Alternatively, the vehicle body 24 may have any suitable construction. The vehicle body 24 may be formed of any suitable material, for example, steel, aluminum, etc.

The vehicle body 24 defines a passenger cabin 26 to house occupants, if any, of the vehicle 12. The passenger cabin 26 may extend across the vehicle 12, i.e., from one side to the other side of the vehicle 12. The passenger cabin 26 includes a front end and a rear end with the front end being in front of the rear end during forward movement of the vehicle 12.

The vehicle 12, i.e., the vehicle body 24, includes the vehicle floor 28. The vehicle floor 28 may define the lower boundary of the passenger cabin 26 and may extend from the front end of the passenger cabin 26 to the rear end of the passenger cabin 26. The vehicle floor 28 may include upholstery, for example, carpet, and may have a class-A surface facing the passenger cabin 26, i.e., a surface specifically manufactured to have a high quality, finished, aesthetic appearance free of blemishes.

With continued reference to FIG. 1, the vehicle 12 includes at least one seat 30. Specifically, the vehicle 12 may include any suitable number of seats 30. As shown in FIG. 1, the seats 30 are supported by the vehicle floor 28. The seats 30 may be arranged in any suitable arrangement in the passenger cabin 26. For example, one or more of the seats 30 may be at the front end of the passenger cabin 26, e.g., a driver seat 30 and/or a passenger seat 30, and/or one or more of the seats 30 may be at the rear end of the passenger cabin 26, i.e., a rear seat.

The seats 30 may be removably attached to the vehicle floor 28, i.e., the seats 30 may not be permanently fixed to the vehicle floor 28. The vehicle floor 28 may include fastener holes 32 arranged in a pattern and the seats 30 may have a mounting base 34 including fastener holes 36 arranged in the pattern of the vehicle floor 28. The seat 30 may include a fastener 38, e.g., screws, threaded bolts, etc., to removably attach the seat 30 with the vehicle floor 28 through the fastener holes 36 of the seat 30 and the fastener holes 32 of the vehicle floor 28. The fastener 38 may be removed from the fastener holes 36 of the seat 30 and the fastener holes 32 of the vehicle floor 28 to remove the seat 30 from the passenger compartment.

As discussed above, the assembly 10 includes the panel 14 including the pair of channels 16, 18. The panel 14 is designed to engage wheels of a wheelchair. Specifically, the channels 16, 18 of the panel 14 are designed to engage wheels of a wheelchair. The channels 16, 18 are designed to receive the wheels of a wheelchair when a wheelchair is in the passenger compartment of the vehicle 12.

The panel 14 includes releasable connections 22 designed to releasably engage the vehicle floor 28. Specifically, the panel 14 is removably attached to and supported by the vehicle floor 28, i.e., the panel 14 is not permanently fixed to the vehicle floor 28. As shown in the Figures, a seat 30 in the vehicle 12, such the rear seat 30, may be removed from the vehicle 12 to replace the seat 30 with the panel 14. In other words, when a seat 30 is removed from the vehicle 12, the panel 14 may take the place of the seat 30 in the vehicle 12. If the panel 14 no longer is needed in the vehicle 12, the panel 14 may be removed from the vehicle 12 and replaced with the seat 30 that was removed. There may be any suitable number of panels 14 in the vehicle 12, i.e., the vehicle 12 may include more than one panel 14 releasable connected to the vehicle floor 28.

The panel 14 may include fastener holes 40 arranged in the pattern of the fastener holes 32 of the vehicle floor 28 and the seats 30. When the panel 14 is to be installed in the vehicle 12, the fastener holes 40 of the panel 14 align with the fastener holes 32 of the vehicle floor 28 to engage the panel 14 with the vehicle floor 28. As shown in the Figures, the fastener holes 32 of the vehicle floor 28, seats 30, and panel 14 may be arranged in a square pattern. The fastener holes 32, 36, 40 may be arranged in any suitable pattern to engage the panel 14 with the vehicle floor 28. The assembly 10 may include fasteners 42, e.g., screws, threaded bolts, etc., to engage the panel 14 to the vehicle floor 28 through the fastener holes 40 of the panel 14 and the vehicle floor 28. The fasteners 42 extend through the fastener holes 40 of the panel 14 and the fastener holes 32 of the vehicle floor 28 to removably attach the panel 14 to the vehicle floor 28.

The vehicle floor 28 may include a recess 88. In an example where the panel 14 is installed in the vehicle 12, the panel 14 may be installed in the recess 88. An edge of the panel 14 may abut an edge of the upholstery on the vehicle floor 28, i.e., the edge of the panel 14 may be aligned with the edge of the upholstery to make a flat surface on the vehicle floor 28. The releasable connections 22 may be in the recess 88. In an example where the seat 30 is installed, the seat 30 may be installed in the recess 88.

The panel 14 includes a top surface 44 and a bottom surface 46. The top surface 44 faces into the passenger compartment of the vehicle 12. The bottom surface 46 faces opposite the top surface 44, i.e., away from the passenger compartment of the vehicle 12. The bottom surface 46 may be adjacent and facing the vehicle floor 28 when the panel 14 is installed in the vehicle 12. The fastener holes 40 of the panel 14 extend through the panel 14, i.e., through the top surface 44 and through to the bottom surface 46.

As discussed above, the panel 14 includes the pair of channels 16, 18 spaced from and parallel to each other. The pair of channels 16, 18 may be referenced as a first channel 16 and a second channel 18. The channels 16, 18 may be elongated along the panel 14. For example, as shown in the Figures, the channels 16, 18 may be elongated along the entire length of the panel 14, i.e., from one end of the panel 14 to the other. In another example, the channels 16, 18 may be elongated only along a portion of the panel 14.

The channels 16, 18 may extend longitudinally in the vehicle 12, i.e., the channels 16, 18 extend longitudinally between the front end and rear end of the passenger compartment. Extending longitudinally allows the wheels of a wheelchair to roll into the channels 16, 18 when the panel 14 is in use in the vehicle 12. The channels 16, 18 are on the top surface 44 of the panel 14, i.e., the channels 16, 18 face toward the passenger compartment to allow wheels of a wheelchair to roll into the channels 16, 18.

The assembly 10 includes the latch 20 supported by the panel 14. The latch 20 secures the wheel of a wheelchair when the wheel is disposed in one of the first or second channels 16, 18 of the panel 14. The latch 20 is positioned adjacent one of the channels 16, 18 such that the latch 20 may engage a wheel of the wheelchair in the channel.

The assembly 10 may include a plurality of latches 20. The assembly 10 may include any suitable number of latches 20 to secure the wheels of the wheelchair and limit the movement of the wheelchair in the channels 16, 18. For example, the number of latches 20 may be equal to the number of wheels of the wheelchair. In the example shown in the Figures, the assembly 10 includes four latches 20, one latch 20 for each of the four wheels of the wheelchair. In such an example, two latches 20 are spaced from each other adjacent the first channel 16 and two latches 20 are spaced from each other adjacent the second channel 18.

The latches 20 are moveable between an unlatched position and a latched position. When the latches 20 are in the unlatched position, the latches 20 are retracted from the channels 16, 18, i.e., the latch 20 is drawn away from the channel when the latch 20 is in the unlatched position. In the unlatched position, the wheels of the wheelchair may be free to roll and/or move within the channels 16, 18. When the latches 20 are in the latched position, the latches 20 are elongated across the channels 16, 18 in the latched position. In the latched position, the wheels of the wheelchair are unable to roll and/or more within the channels 16, 18.

In the latched position, the latches 20 are designed to extend through a wheel of a wheelchair adjacent the latch 20. The latches 20 elongate across the channels 16, 18 and through the wheel of the wheelchair when in the latched position. The wheel of the wheelchair may include spokes, as shown in the Figures. The latch 20 limits the rolling and movement of the wheels of the wheelchair by extending through the wheel, i.e., between the spokes, and across the channels 16, 18.

As shown in the example in FIGS. 1-4, the latches 20 may be manual. In other words, the latches 20 may be manually moved from the unlatched position to the latched position by a passenger of the vehicle 12. In such an example, the latch 20 may include a hook 48 and an eye 50 mounted to the top surface 44 of the panel 14. The hook 48 may be on one side of the channel and the eye 50 may extend through the wheel of the wheelchair from the other side of the channel. The latch 20 may include a handle 52 connected to the eye 50 to move the eye 50 through the wheel of the wheelchair and across the channel to the hook 48. The eye 50 is looped around the hook 48 and moved into the latched position by pressing the handle 52 toward the top surface 44 of the panel 14. The hook 48 may be spring loaded, i.e., when in the latched position, a spring pulls the eye 50 to ensure that the latch 20 remains in the latched position when the vehicle 12 is in use.

Figure 5:
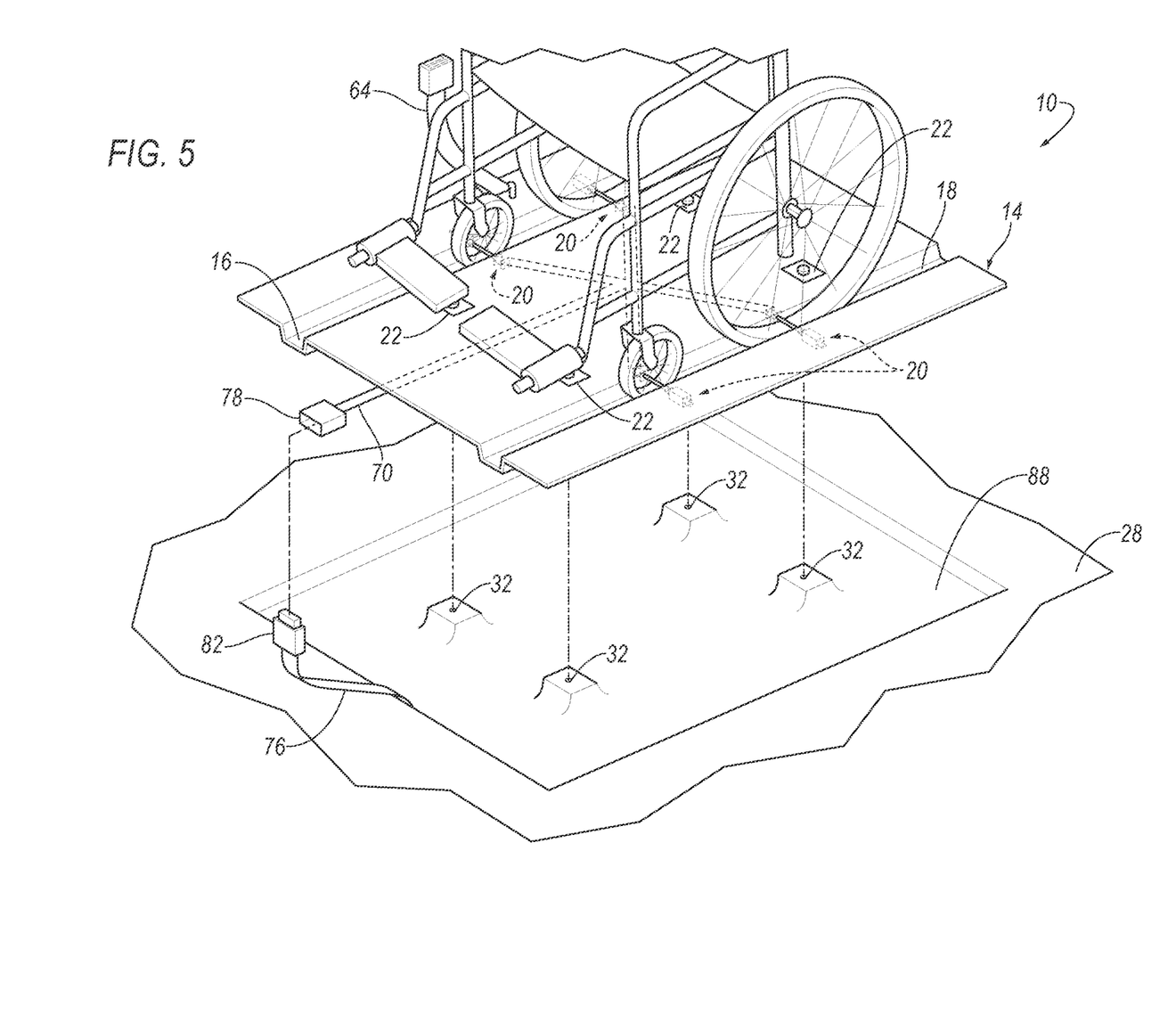
FIG. 5 is a perspective view of the panel including a latch including a solenoid engaged with wheels of a wheelchair.
Figure 6A:
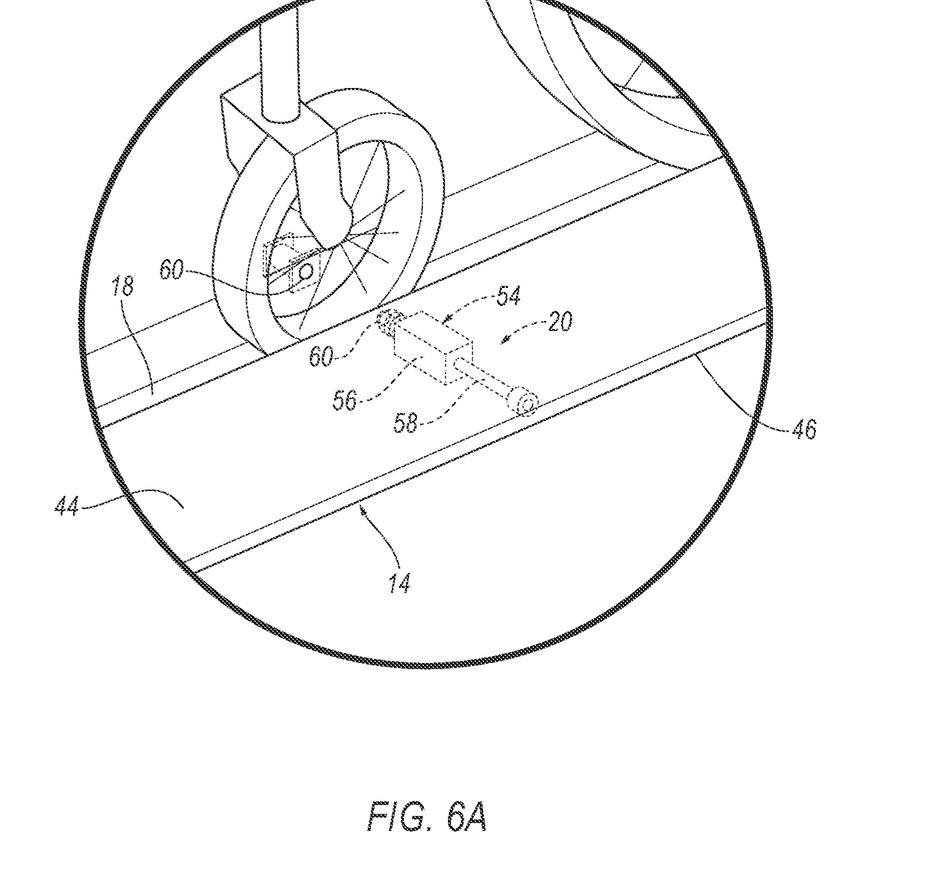
FIG. 6A is a perspective view of the latch including the solenoid in an unlatched position.
Figure 6B:
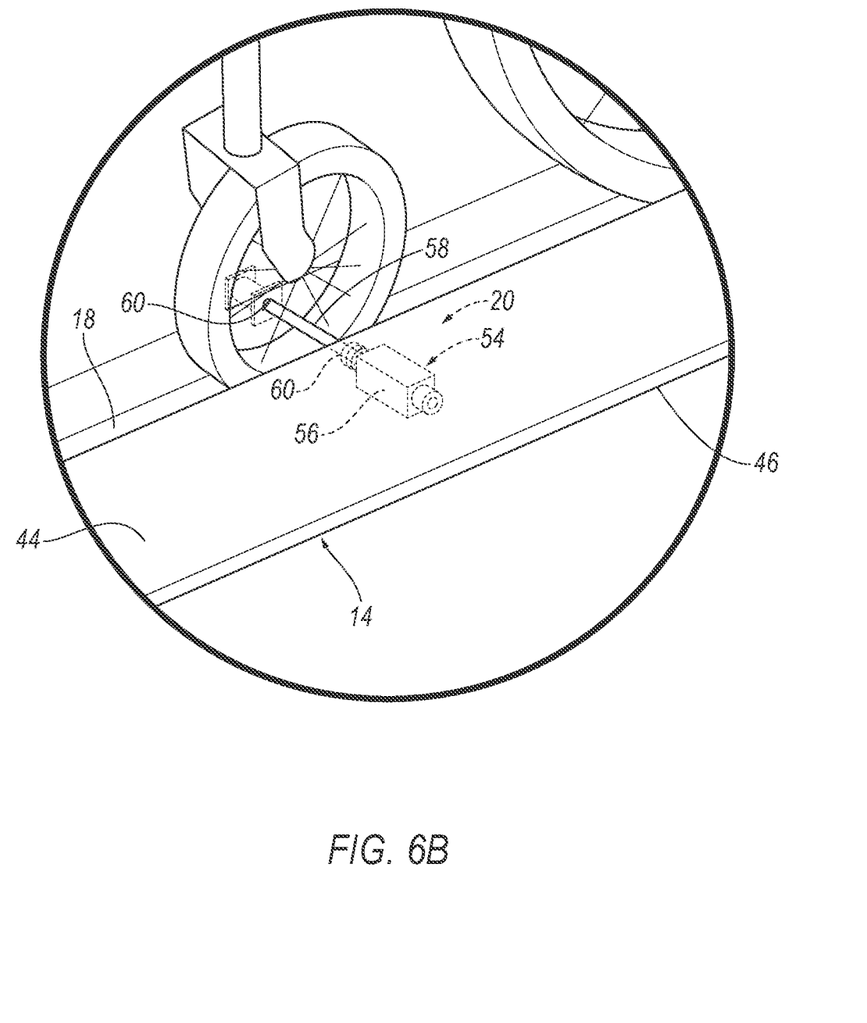
FIG. 6B is a perspective view of the latch including the solenoid in a latched position.
Figure 7:
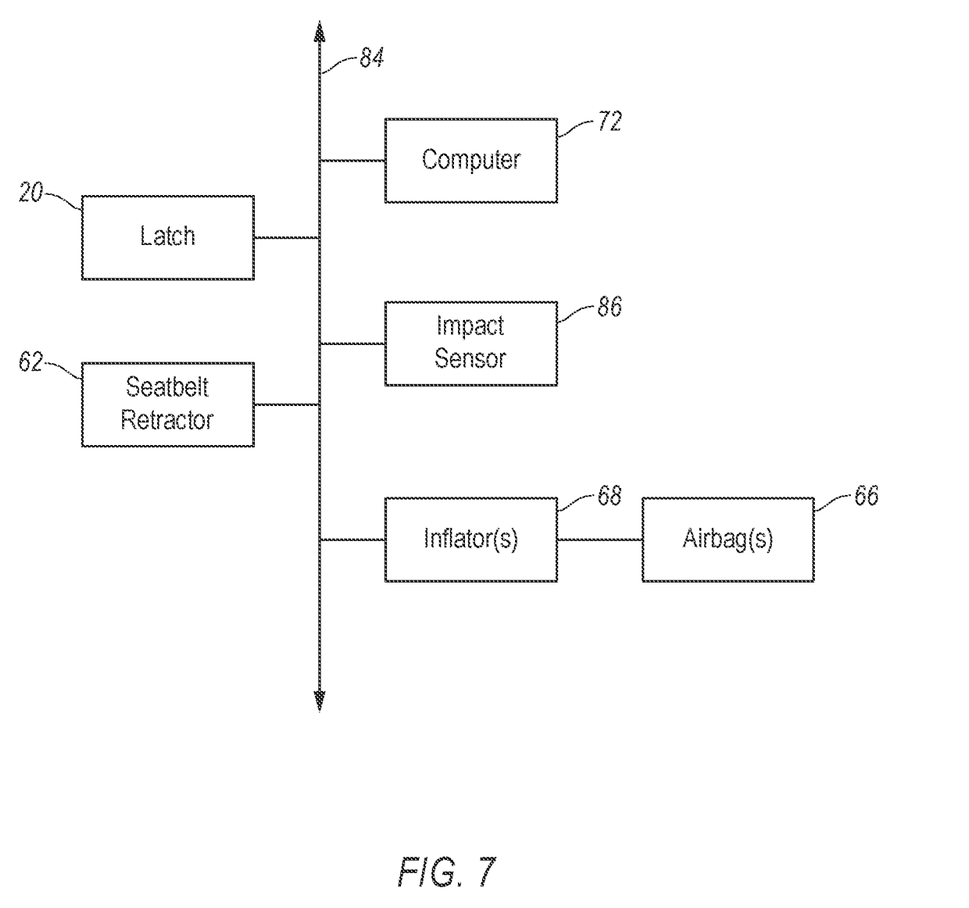
FIG. 7 is a block diagram showing a system of the vehicle.

In another example, as shown in FIGS. 5, 6A, and 6B, the latches 20 may be electronic. In such an example, the latch 20 includes a solenoid 54. The solenoid 54 includes a body 56 mounted to the panel 14 and a post 58 extendable from the body 56. The body 56 of the solenoid 54 may be disposed on the bottom surface 46 of the panel 14, i.e., the body 56 of the solenoid 54 may be between the panel 14 and the floor of the vehicle 12.

The panel 14 may define a pair of holes 60 in the channels 16, 18 positioned adjacent the post 58 and body 56 of the solenoid 54. In the unlatched position, the post 58 of the solenoid 54 is retracted from the channel and is retracted from at least one of the holes 60 in the unlatched position. The wheels of the wheelchair are free to roll/move in the channel of the panel 14. The panel 14 may include a pair of holes 60 in the channels 16, 18 that correspond to each of the number of latches 20 supported by the panel 14. In other words, each latch 20 has a pair of holes 60 adjacent the latch 20.

In the latched position, the post 58 is elongated across the channel. The post 58 extends from the body 56 of the solenoid 54, through both the holes 60, and is elongated across the channel. Specifically, the post 58 of the solenoid 54 extends from the body 56 of the solenoid 54, through both holes 60, and across the top surface 44 of the panel 14 to the latched position. The post 58 of the solenoid 54 is designed to extend through a wheel of a wheelchair when the latch 20 is in the latched position. In the latched position, the wheel's movement in the channel of the panel 14 is limited because the post 58 of the solenoid 54 passes through the wheel of the wheelchair.

The vehicle 12 includes a seatbelt assembly. The seatbelt assembly may include a seatbelt retractor 62 and a webbing retractably payable from the seatbelt retractor 62. The seatbelt assembly may include a seatbelt buckle 64 supported by the panel 14. The seatbelt buckle 64 may be releasably connectable to the seatbelt retractor 62. Specifically, the seatbelt assembly may include an anchor coupled to the webbing, and a clip that engages the seatbelt buckle 64. The seatbelt assembly may be disposed adjacent the seat 30 when a seat 30 is installed in the vehicle 12. For example, the seatbelt assembly is adjacent the front seat 30. When the panel 14 is installed in the vehicle 12, the seatbelt assembly may be disposed adjacent the panel 14. The seatbelt assembly, when fastened, retains the occupant on the seat 30 or wheelchair, e.g., during sudden decelerations of the vehicle 12.

The seatbelt retractor 62 may be mounted to the vehicle body 24. For example, the seatbelt retractor 62 may be attached to the B-pillar. As another example, when the seatbelt assembly is adjacent the rear seat 30, the seatbelt retractor 62 may be attached to the C pillar. Alternatively, the seatbelt retractor 62 may be attached to the roof of the vehicle body 24. The seatbelt retractor 62 may be attached to the vehicle body 24 in any suitable manner, e.g., fasteners.

The vehicle 12 includes one or more airbags 66. The vehicle 12 may include airbags 66 supported by the panel 14 or supported by the vehicle body 24 such as curtain, roof, door, floor, etc. The vehicle 12 includes one or more inflators 68 in fluid communication with the airbags 66. Upon receiving a signal from, e.g., a computer 72, the inflator 68 inflates the airbag 66 with an inflatable medium, such as a gas. The inflator 68 may be, for example, a pyrotechnic inflator 68 that uses a chemical reaction to drive inflation medium to the airbag 66. The inflator 68 may be of any suitable type, for example, a cold-gas inflator 68.

The airbag 66 may be a woven polymer or any other material. In one example, the airbag 66 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The assembly 10 may include a wiring harness (hereinafter referred to as the "panel wiring harness" 70) supported by the panel 14 and connected to the latches 20. Specifically, the panel wiring harness 70 may transmit signals to and from the latch 20 and may provide power to the latch 20. As discussed below, the panel wiring harness 70 may be releasably connectable to a computer 72 of the vehicle 12, e.g., a restraints control module (RCM), and the computer 72 transmits signals to and/or receives signals from the latch 20. For example, in examples in which the latches 20 are manual, the panel wiring harness 70 may transmit signals indicating that the latch 20 is in the latched position or in the unlatched position. In such examples, the latches 20 may include position sensors, proximity sensors, etc. that detect whether the latch 20 is in the latched position or the unlatched position. In examples in which the latches 20 are electronic, the panel wiring harness 70 may transmit signals indicating that he latch 20 is in the latched position or the unlatched position and/or may provide instruction, i.e., a signal, to the latch 20 to move between the latched position and the unlatched position. Specifically, in examples in which the latch 20 is a solenoid 54, the panel wiring harness 70 transmits signals to the solenoid 54 to move the post 58 between the latched position and the unlatched position As shown in FIG. 1, each seat 30 may include a seat wiring harness 74. The seat wiring harness 74 transmits signals to and from components of the seat 30 and may provide power to components of the seat 30. The seat wiring harness 74 may be releasably connectable to the computer 72 of the vehicle 12, e.g., the RCM, and the computer 72 transmits signals to and/or receives signals from components of the seat 30, e.g., airbags 66, seat belt assemblies, etc.

The panel wiring harness 70 and the seat wiring harness 74 may be releasably connectable to the computer 72, e.g., the RCM. The vehicle 12 may include a plurality of wiring harnesses (hereinafter referred to as "vehicle wiring harnesses" 76) connected to the computer 72. Specifically, the vehicle 12 includes one vehicle wiring harness 76 at each seating location, i.e., at each location that seat 30 or a panel may be mounted. The panel wiring harness 70 and the seat wiring harness 74 may be releasably connectable to the vehicle wiring harnesses 76.

The panel wiring harness 70 and the seat wiring harness 74 are designed to engage the vehicle wiring harness 76 to transmit signals and/or power therethrough. The panel wiring harness 70 and the seat wiring harness 74 may be designed to be disconnected from the vehicle wiring harness 76 without destruction of the wiring harnesses. In other words, the panel wiring harness 70 and the vehicle wiring harness 76 may be repeatedly connected and disconnected and the seat wiring harness 74 and the vehicle wiring harness 76 may be repeatedly connected and disconnected. As an example, the panel wiring harness 70 and the seat wiring harness 74 may each include terminals 78, 80 that releasably engage a terminal 82 of the vehicle wiring harness 76. The terminals 78, 80, 82 may be, for example, quick disconnect terminals as is known in automotive application. The terminal 78 of the panel wiring harness 70 may be identical to the terminal 80 of the seat wiring harness 74, and the terminal 78 of the panel wiring harness 70 and the seat wiring harness 74 are each designed to mate, alternatively, with the vehicle wiring harness 76.

The computer 72 of the vehicle 12 has a processor and memory storing instructions executable by the processor to control components of the vehicle 12. The memory stores instructions to perform the steps shown in FIG. 8 and as described below. The memory includes one or more forms of computer 72 readable media, and stores instructions executable by the vehicle computer 72 for performing various operations, including as disclosed herein. As in the example described above, the computer 72 may be a restraint control module (RCM). The restraint control module may be in communication with and may control the airbag(s) 66, the seatbelt retractor(s) 62, e.g., the torsion bar of the seatbelt retractor 62, seatbelt pretensioners, etc., in the vehicle 12, among other functions.

The computer 72 may include or be communicatively coupled to, e.g., via a vehicle network such as a communications bus as described further below, more than one processor, e.g., included in components such as sensors, electronic controller units (ECUs) or the like included in the vehicle 12 for monitoring and/or controlling various vehicle 12 components, e.g., a powertrain controller, a brake controller, a steering controller, etc. The computer 72 is generally arranged for communications on a vehicle communication network 84 that can include a bus in the vehicle 12 such as a controller area network (CAN) or the like, and/or other wired and/or wireless mechanisms.

Via the vehicle network, the computer 72 may transmit messages to various devices in the vehicle 12 and/or receive messages (e.g., CAN messages) from the various devices, e.g., sensors, an actuator, a human machine interface (HMI), etc. Alternatively or additionally, in cases where the computer 72 actually comprises a plurality of devices, the vehicle communication network 84 may be used for communications between devices represented as the computer 72 in this disclosure. Further, as mentioned below, various controllers and/or sensors may provide data to the computer 72 via the vehicle communication network 84.

The vehicle 12 may include at least impact sensor 86 in communication with the computer 72. The impact sensor 86 is configured to detect an impact to the vehicle 12. The impact sensor 86 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 86 may be located at numerous points in or on the vehicle 12.

Figure 8:
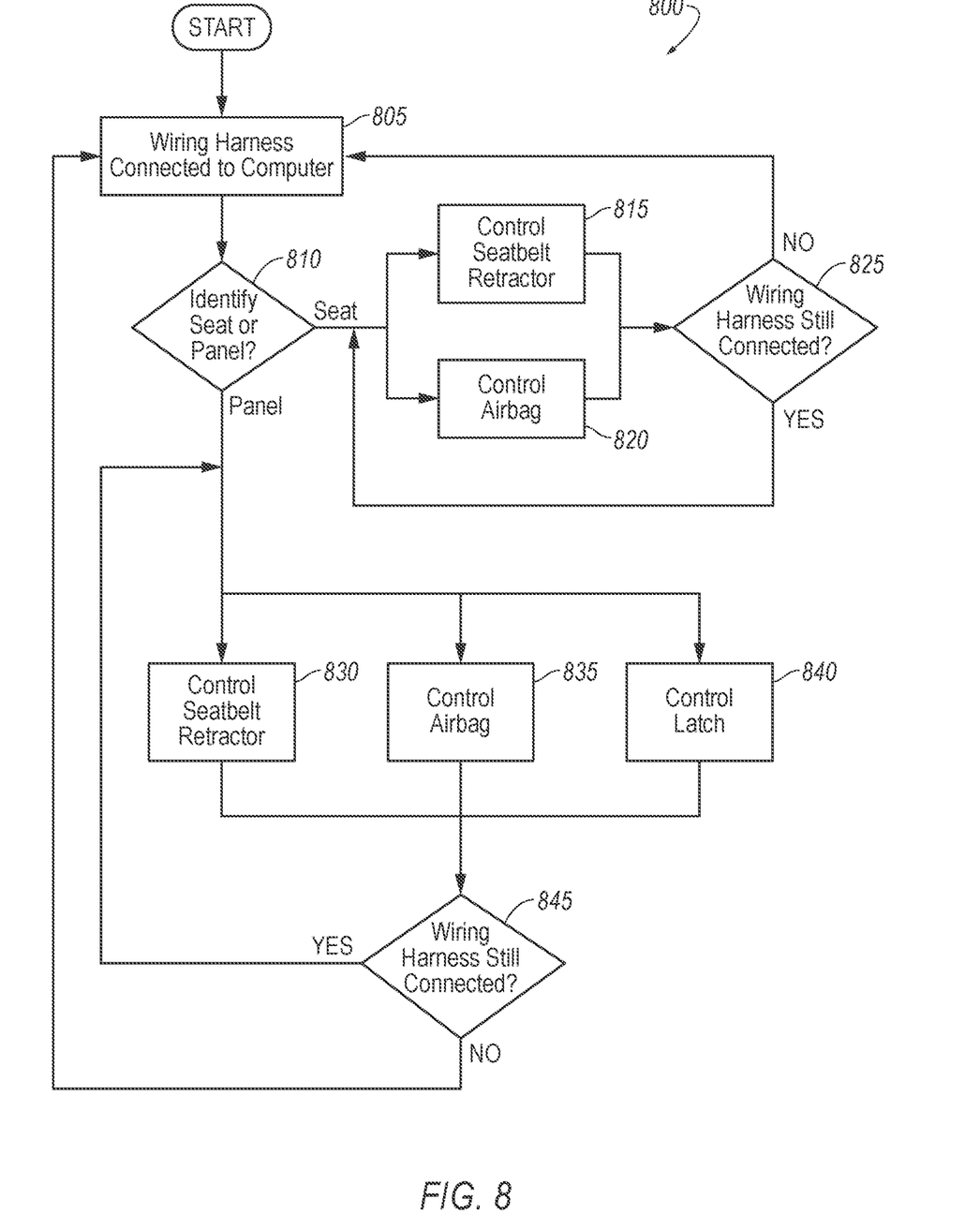
FIG. 8 is a flowchart showing instructions executable by a computer of the vehicle.

With reference to FIG. 8, the computer 72, e.g., RCM, stores instructions to control components of the vehicle 12 according to the method 800 shown in FIG. 8. Specifically, as shown in FIG. 8, the computer 72 determines whether a panel 14 or a seat 30 is connected to the computer 72 and controls components of the vehicle 12 in response to that determination. The computer 72 may perform the method 800 for each vehicle wiring harness 76 to individually control components of the vehicle 12 at each seating area. "In response to" and "based on" are used throughout this text to indicate a causal relationship, not merely a temporal relationship. For example, the computer 72 controls components of the vehicle 12 as a direct result of determining whether the seat 30 or the panel 14 is connected to the computer 72.

With reference to block 805, the method includes connecting a wiring harness 78, 80, 82 to the computer 72, as described above. For example, this may include the connection of the panel wiring harness 70 to the vehicle wiring harness 76 or the connection of the seat wiring harness 74 to the vehicle wiring harness 76.

With reference to decision block 810, the computer 72 determines whether the panel 14 is connected to the computer 72 or the seat 30 is connected to the computer 72. Specifically, as set forth above, the vehicle wiring harness 76 transmits signals to and from the computer 72. When the seat wiring harness 74 is connected to the vehicle wiring harness 76, signals from components of the seat 30 to the computer 72 and signals from the computer 72 to components of the seat 30 are communicated through the seat wiring harness 74 and the vehicle wiring harness 76. When the panel wiring harness 70 is connected to the vehicle wiring harness 76, signals from the latch 20 to the computer 72 and signals from the computer 72 to the latch 20 are communicated through the panel wiring harness 70 and the vehicle wiring harness 76. The computer 72 may identify the seat 30 or the panel 14 based on these communications. For example, when connected to the panel wiring harness 70, the computer 72 may detect signals or other indicators from the latch 20 to identify that the panel 14 is connected to the computer 72. When connected to the seat wiring harness 74, the computer 72 may detect signals or other indicates from one or more components of the seat 30, e.g., the seatbelt retractor 62 or the airbag 66, to identify that the seat 30 is connected to the computer 72. As shown in FIG. 8, the operation of the computer 72, i.e., which instructions are used, is based on the determination in block 810.

Specifically, with reference to block 835, when the panel 14 is installed in the vehicle 12, the computer 72 may include instructions to control at least the airbag 66 based on the detection of the panel 14. For example, the computer 72 may control curtain airbags 66, roof mounted airbags 66, and/or floor mounted airbags 66, etc., based on the detection of the panel 14. Specifically, the computer 72 may control inflation timing, inflation pressure (e.g., with variable control of one or more inflators 68 as is known), airbag 66 thickness and/or stiffness (e.g., by controlling internal or external tethers of the airbag 66 as is known) in a way suitable for an occupant of a wheelchair supported by the panel 14 in the event of a vehicle impact. In other words, an occupant of a wheelchair on the panel 14 may be positioned differential than an occupant in the seat 30, and the operation of airbags 66 are tailored to the position of the occupant in the wheelchair when the panel 14 is detected in block 810.

With reference to block 830, when the panel 14 is installed in the vehicle 12, the computer 72 may include instructions to control operation of the seatbelt assembly based on the detection of the panel 14. Specifically, the computer 72 may control operation of a torsion bar of the seatbelt retractor 62 as is known, and/or a pretensioner as is known, etc., in a way suitable for the occupant of a wheelchair supported by the panel 14 in the event of a vehicle impact. In other words, since an occupant in a wheelchair on the panel 14 may be positioned differently than an occupant in the seat 30, the operation of the seatbelt assembly is tailored to the position of the occupant in the wheelchair when the panel 14 is detected in block 810.

With reference to block 840, the computer 72 may include instructions to control operation of the latch 20 based on detection of the panel 14. For example, the computer 72 may move the latch 20, e.g., the solenoid 54, between the latched and unlatched position. Specifically, the computer 72 may move the latch 20 based on an automatic identification that the wheelchair is present on the panel 14 and/or may be based on manual input from an occupant that a wheelchair is on the panel 14, e.g., through a human-machine interface. As another example, the computer 72 may receive a signal from the latch 20 that the latch 20 is in the latched position or the unlatched position. The computer 72 may use this information to control operation of airbags 66, seatbelt assemblies, etc., and/or to prevent motion of the vehicle 12.

With reference to block 820, when the seat 30 is installed in the vehicle 12, the computer 72 may include instructions to control at least the airbag 66 based on the detection of the seat 30. For example, the computer 72 may control curtain airbags 66, roof mounted airbags 66, seat-mounted airbags 66, and/or floor mounted airbags 66, etc., based on the detection of the seat 30. Specifically, the computer 72 may control inflation timing, inflation pressure (e.g., with variable control of one or more inflators 68 as is known), airbag 66 thickness and/or stiffness (e.g., by controlling internal or external tethers of the airbag 66 as is known) in a way suitable for the occupant of the seat 30 in the event of a vehicle impact. In other words, an occupant of the seat 30 may be positioned differential than an occupant in a wheelchair on the panel 14, and the operation of airbags 66 are tailored to the position of the occupant on the seat 30 when the seat 30 is detected in block 810.

With reference to block 815, when the seat 30 is installed in the vehicle 12, the computer 72 may include instructions to control operation of the seatbelt assembly based on the detection of the seat 30. Specifically, the computer 72 may control operation of a torsion bar of the seatbelt retractor 62 as is known, and/or a pretensioner as is known, etc., in a way suitable for the occupant of a seat 30 in the event of a vehicle impact. In other words, since an occupant in a seat 30 may be positioned differently than an occupant in a wheelchair, the operation of the seatbelt assembly is tailored to the position of the occupant in the seat 30 when the seat 30 is detected in block 810.

As shown in blocks 825 and 845, the computer 72 may detect a disconnection of the panel wiring harness 70 or the seat wiring harness 74 from the vehicle wiring harness 76. As another example, the computer 72 may detect a connection of a different wiring harness to the vehicle wiring harness 76. In either scenario, as shown at blocks 840 and 845, the computer 72 restarts the method 800.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle floor;
   a panel removably attached to and supported by the vehicle floor, the panel being designed to engage wheels of a wheelchair;
   a latch supported by the panel and being moveable between an unlatched position and a latched position;
   a wiring harness supported by the panel and connected to the latch; and
   a computer, the latch being releasably connectable to the computer;
   the computer having a processor and memory storing instructions executable by the processor to control components of the vehicle based on connection of the wiring harness to the computer.

2. The vehicle of claim 1, wherein the vehicle floor includes fastener holes arranged in a pattern and the panel includes fastener holes arranged in the pattern, and further comprising fasteners engaging the panel to the vehicle floor through the fastener holes of the panel and the vehicle floor.

3. The vehicle of claim 2, further comprising a seat having a mounting base including fastener holes arranged in the pattern of the fastener holes of the vehicle floor.

4. The vehicle of claim 2, wherein:
   the panel includes a pair of channels spaced from and parallel to each other, the channels being designed to engage wheels of a wheelchair; and
   the latch includes a solenoid including a body mounted to the panel and a post extendable from the body, the post being retracted from a first channel of the pair of channels in the unlatched position and being elongated across the first channel when the latch is in the latched position.

5. The vehicle of claim 4, further comprising a restraint control module, the wiring harness being connected to the solenoid and the restraint control module.

6. The vehicle of claim 4, wherein the panel defines a pair of holes in the first channel, the post of the solenoid extending through both holes in the latched position and being retracted from at least one of the holes in the unlatched position.

7. The vehicle of claim 4, wherein the body of the solenoid is between the panel and the vehicle floor.

8. The vehicle of claim 1, wherein the latch is electronic.

9. The vehicle of claim 1, further comprising an airbag, the memory storing instructions to control at least the airbag based on connection of the wiring harness to the computer.

10. The vehicle of claim 1, further comprising a seat belt retractor, the memory storing instructions to control at least the seat belt retractor based on connection of the wiring harness to the computer.

11. The vehicle of claim 10, further comprising a seat belt buckle supported by the panel, the seat belt buckle being releasably connectable to the seat belt retractor.

12. The vehicle of claim 1, further comprising a seat belt buckle supported by the panel.

13. An assembly comprising:
    a panel including a first channel and a second channel spaced from and parallel to each other, the first and second channels being designed to engage wheels of a wheelchair; and
    a latch supported by the panel and the latch being moveable between an unlatched position and a latched position, the latch being retracted from the first channel in the unlatched position and elongated across the first channel in the latched position;
    the panel including releasable connections designed to releasably engage a vehicle floor.

14. The assembly of claim 13, wherein the latch includes a solenoid including a body mounted to the panel and a post extendable from the body, the post being retracted from the first channel in the unlatched position and being elongated across the first channel when the latch is in the latched position.

15. The assembly of claim 14, wherein the panel includes a pair of holes in the first channel, the post of the solenoid extending through both holes in the latched position and being retracted from at least one of the holes in the unlatched position.

16. The assembly of claim 14, further comprising a wiring harness supported by the panel and connected to the solenoid, the wiring harness being designed to be connected to a restraint control module.

17. The assembly of claim 14, wherein:
    the panel includes a top surface and a bottom surface facing opposite the top surface, the first channel is on the top surface of the panel and the body of the solenoid is disposed on the bottom surface of the panel; and
    the panel includes a pair of holes in the first channel, the post of the solenoid extending through both holes across the top surface of the panel in the latched position and being retracted from at least one of the holes in the unlatched position.

18. The assembly of claim 17, further comprising a wiring harness supported by the panel and connected to the solenoid, the wiring harness being designed to be connected to a restraint control module.

19. The assembly of claim 13, further comprising a seatbelt buckle supported by the panel.

20. A vehicle comprising:
    a vehicle floor;
    a panel removably attached to and supported by the vehicle floor, the panel being designed to engage wheels of a wheelchair; and
    a latch supported by the panel and being moveable between an unlatched position and a latched position;
    the vehicle floor including fastener holes arranged in a pattern and the panel includes fastener holes arranged in the pattern;
    a plurality of fasteners engaging the panel to the vehicle floor through the fastener holes of the panel and the vehicle floor; and
    a seat having a mounting base including fastener holes arranged in the pattern of the fastener holes of the vehicle floor.

* * * * *